US009209435B2

(12) United States Patent
Ahn et al.

(10) Patent No.: US 9,209,435 B2
(45) Date of Patent: Dec. 8, 2015

(54) RECHARGEABLE BATTERY

(71) Applicants: SAMSUNG SDI CO., LTD., Yongin-si, Gyeonggi-do (KR); ROBERT BOSCH GMBH, Stuttgart (DE)

(72) Inventors: Byung-Kyu Ahn, Yongin-si (KR); Joong-Heon Kim, Yongin-si (KR); Zin Park, Yongin-si (KR); Duk-Jung Kim, Yongin-si (KR); Min-Hyung Guen, Yongin-si (KR); Myung-Chul Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 278 days.

(21) Appl. No.: 13/754,762

(22) Filed: Jan. 30, 2013

(65) Prior Publication Data

US 2013/0260220 A1 Oct. 3, 2013

Related U.S. Application Data

(60) Provisional application No. 61/617,452, filed on Mar. 29, 2012.

(51) Int. Cl.
*H01M 2/04* (2006.01)
*H01M 2/02* (2006.01)

(52) U.S. Cl.
CPC .............. *H01M 2/04* (2013.01); *H01M 2/0217* (2013.01); *H01M 2/0237* (2013.01); *H01M 2/0267* (2013.01); *H01M 2/0292* (2013.01); *H01M 2/043* (2013.01); *H01M 2/0404* (2013.01); *H01M 2/0491* (2013.01)

(58) Field of Classification Search
CPC . H01M 2/34; H01M 10/0431; H01M 2/0404; H01M 2/30
USPC .......................................................... 429/164
See application file for complete search history.

(56) References Cited

U.S. PATENT DOCUMENTS 5,212,025 A * 5/1993 Shibata et al. ................ 429/120
2005/0164080 A1 7/2005 Kozu et al.
2011/0039133 A1* 2/2011 Lee et al. ........................ 429/7

FOREIGN PATENT DOCUMENTS

| EP | 1 717 882 A1 | 11/2006 |
|---|---|---|
| JP | 2009-295381 | 12/2009 |
| JP | 2011-108377 | 6/2011 |
| JP | 2012-33419 | 2/2012 |
| KR | 10-2011-0016409 | 2/2011 |

OTHER PUBLICATIONS

EPO Search Report dated May 29, 2013, for corresponding European Patent application 13154748.1, (4 pages).

(Continued)

*Primary Examiner* — Stewart Fraser
*Assistant Examiner* — Olatunji Godo
(74) *Attorney, Agent, or Firm* — Christie, Parker & Hale, LLP

(57) ABSTRACT

A rechargeable battery including an electrode assembly; a case containing the electrode assembly; a cap plate covering an opening of the case; and an external insulating member on an outer surface of the case, the external insulating member including an insulating cover on the cap plate, and an insulating tape coupled to the insulating cover on the case.

18 Claims, 9 Drawing Sheets

(56) References Cited

OTHER PUBLICATIONS

Patent Abstracts of Japan and Machine English Translation of JP 2009-295381 (16 sheets), Dec. 17, 2009.

Patent Abstracts of Japan and Machine English Translation of JP 2011-108377 (11 sheets), Jun. 2, 2011.

Patent Abstracts of Japan and Machine English Translation of JP 2012-33419 (20 sheets), Feb. 16, 2012.

* cited by examiner

RECHARGEABLE BATTERY

CROSS-REFERENCE TO RELATED APPLICATION

This application claims priority to and the benefit of U.S. Provisional Application No. 61/617,452, filed on Mar. 29, 2012 in the United States Patent and Trademark Office, the entire content of which is incorporated herein by reference.

BACKGROUND

1. Field

Aspects of embodiments of the present invention relate to a rechargeable battery.

2. Description of the Related Art

Unlike a primary battery that cannot be recharged, a rechargeable battery can be repeatedly charged and discharged.

A small-capacity rechargeable battery is typically used for small portable electronic devices such as mobile phones, notebook computers, camcorders, and the like, while a large-capacity rechargeable battery may be used as a motor-driving power source or large-capacity power storage device, such as for an electric vehicle, a hybrid vehicle, and the like.

Nowadays, a high-power rechargeable battery using a non-aqueous electrolyte of a high energy density has been developed, and the high-power rechargeable battery is formed as a large-capacity rechargeable battery by coupling a plurality of rechargeable batteries in series to use for driving a motor of a device, such as an electric vehicle requiring a large amount of electric power, for example.

The rechargeable battery may have a cylindrical shape or a prismatic shape. An outer surface of a case of the rechargeable battery may be coated with an insulating material or may be wrapped with an injection insulating tape to prevent a current in the rechargeable battery from being discharged to the outside of the rechargeable battery through the case and intercept electrical contact with neighboring rechargeable batteries.

However, when the outer surface of the case is coated with an insulating material, it is impossible or complicated to coat the entire outer surface of the case where a cap plate is provided while preventing the same from being exposed to the outside because of a problem of controlling a thickness of a coated layer to be constant and various elements installed on the cap plate.

Further, when the outer surface of the case is wrapped with an insulating tape, a part of the outer surface of the case may be exposed between the insulating tape wrapping the outer surfaces of the case. Resultantly, the outer surface of the case is incompletely insulated such that electricity may be discharged to the outside of the case or a short circuit may be generated between neighboring rechargeable batteries.

In addition, to perfectly close and seal the outer surface of the case for the purpose of overcoming the above-noted problem, a process for closing and sealing the outer surface of the case becomes complicated.

The above information disclosed in this Background section is only for enhancement of understanding of the background of the described technology and therefore it may contain information that does not form the prior art that is already known in this country to a person of ordinary skill in the art.

SUMMARY

According to an aspect of embodiments of the present invention, a rechargeable battery has a configuration in which an outer surface of a case is insulated and prevents electricity from being discharged to the outer surface of the case.

According to another aspect of embodiments of the present invention, a rechargeable battery has a configuration in which an outer surface of a case is easily insulated.

According to an embodiment of the present invention, a rechargeable battery includes: an electrode assembly; a case containing the electrode assembly; a cap plate covering an opening of the case; and an external insulating member on an outer surface of the case, the external insulating member including an insulating cover on the cap plate, and an insulating tape coupled to the insulating cover on the case.

An area of the insulating tape may be greater than an external surface area of the case.

At least a portion of the insulating tape may be interposed between the case and the insulating cover.

At least a portion of the insulating cover may be interposed between the case and the insulating tape.

The insulating cover may be coupled to at least one of the cap plate or the case at a first end of the case, and the insulating tape may be coupled to a side of the case extending between the first end of the case and a second end of the case opposite the first end.

The insulating tape may include: a first insulating tape on a first side of the case extending between the first end of the case and a second end of the case opposite the first end; and a second insulating tape on a second side of the case extending between the first end of the case and the second end of the case, the second side being opposite to the first side.

The first insulating tape may include: a body portion on the first side of the case; a first side portion on a third side of the case extending between the first and second sides of the case; and a second side portion on a fourth side of the case opposite the third side and extending between the first and second sides of the case, and the second insulating tape may include: a body portion on the second side of the case; a first side portion on the third side of the case; and a second side portion on the fourth side of the case.

A width of the third side of the case may be less than a sum of a width of the first side portion of the first insulating tape and a width of the first side portion of the second insulating tape.

The third and fourth sides of the case may be substantially perpendicular to the first and second sides, and the first and second side portions of the first insulating tape may be substantially perpendicular relative to the body portion of the first insulating tape, and the first and second side portions of the second insulating tape may be substantially perpendicular relative to the body portion of the second insulating tape.

An end of the second insulating tape may overlap an end of the first insulating tape.

The insulating cover may include: a body portion on the first end of the case; and a side portion extending from the body portion and covering a portion of a side of the case extending between the first end of the case and a second end of the case opposite the first end, the body portion and the side portion together defining a recess of the insulating cover receiving the first end of the case.

The side portion of the insulating cover may cover a portion of the insulating tape.

The insulating tape may at least partially cover the side portion of the insulating cover.

The insulating cover may include an adhesive, and the insulating cover may be coupled to at least one of the cap plate or the case via the adhesive.

The insulating tape may cover a second end of the case opposite a first end.

A portion of the insulating tape covering the second end of the case may be at an angle relative to a portion of the insulating tape on a side of the case extending between the first and second ends.

A width of the portion of the insulating tape may be greater than a width of the case at the second end.

The insulating cover may be a first insulating cover, and the external insulating member may further include a second insulating cover on a second end of the case opposite the first end.

The second insulating cover may include: a body portion covering the second end of the case; and a side portion extending from the body portion and covering a portion of the insulating tape, the body portion and the side portion together defining a recess of the second insulating cover receiving the second end of the case.

The insulating tape may have a thickness of 70 µm to 100 µm.

According to another embodiment of the present invention, a rechargeable battery includes: a case, an electrode assembly received by the case, a cap plate for closing and sealing an opening of the case, and an external insulating member combined to an outer surface of the case, and the external insulating member includes an insulating cover and an insulating tape, and the insulating cover and the insulating tape while combined with each other are combined to the outer surface of the case.

According to an aspect of embodiments of the present invention, in a rechargeable battery, an outer surface of a case can be insulated such that the current generated inside the rechargeable battery may not be discharged to the outer surface of the case, and the outer surface of the case can be easily closed and sealed.

BRIEF DESCRIPTION OF THE DRAWINGS

The accompanying drawings, together with the specification, illustrate some exemplary embodiments of the present invention, and, together with the description, serve to explain principles and aspects of the present invention.

DETAILED DESCRIPTION

Figure 1:
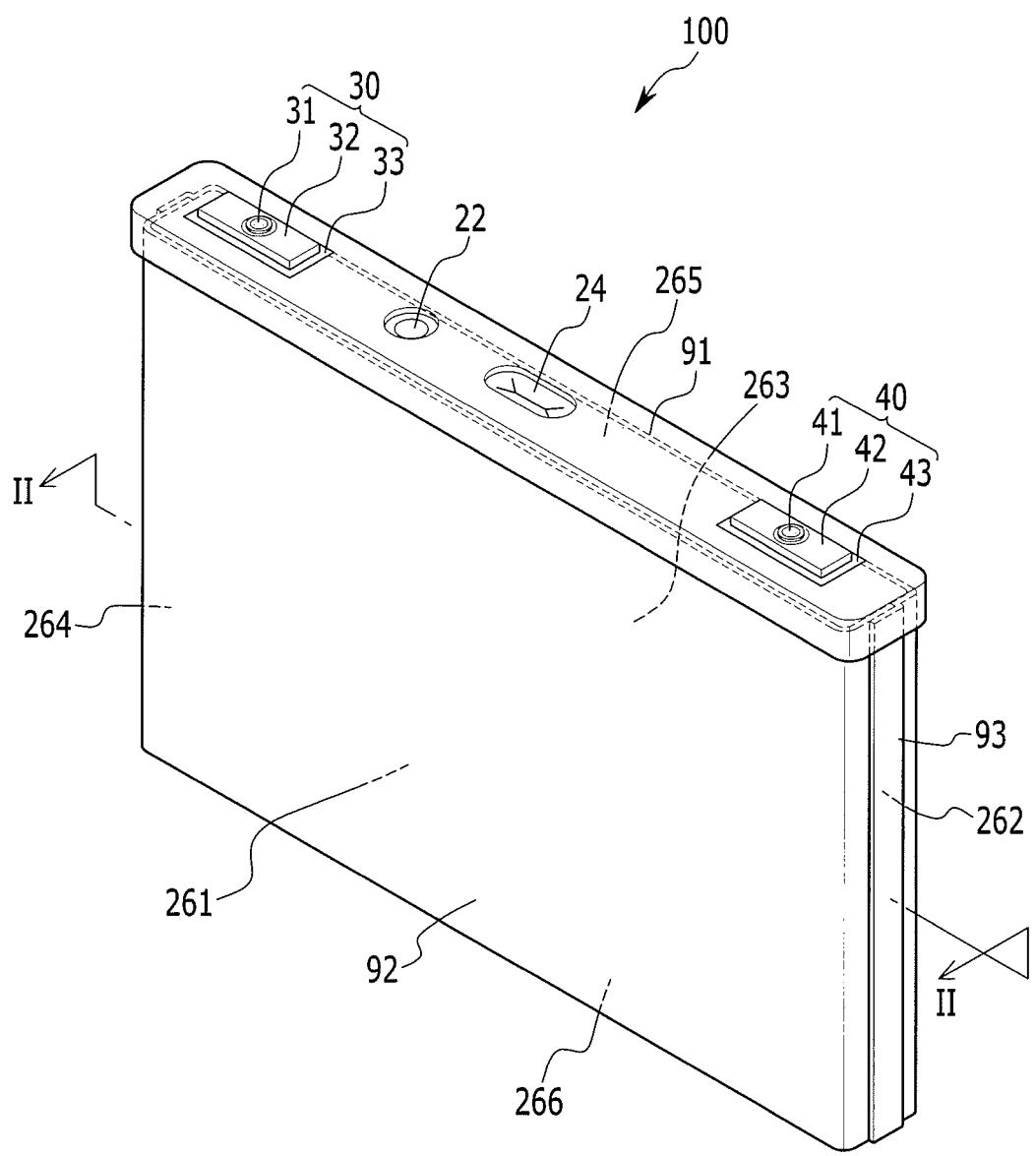
FIG. 1 is a perspective view of a rechargeable battery according to an exemplary embodiment of the present invention.

In the following detailed description, certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

In the drawings, the dimensions of layers and regions may be exaggerated for purposes of illustration. It is to be understood that when a layer (or film) is referred to as being "on" another layer or substrate, it can be directly on another layer or substrate, or one or more intervening layers may also be present. Further, it is to be understood that when a layer is referred to as being "under" another layer, it can be directly under another layer, or one or more intervening layers may also be present. In addition, it is to be understood that when a layer is referred to as being "between" two layers, it can be the only layer between the two layers, or one or more intervening layers may also be present. In the description and drawings, like reference numerals refer to like elements throughout.

Figure 2:
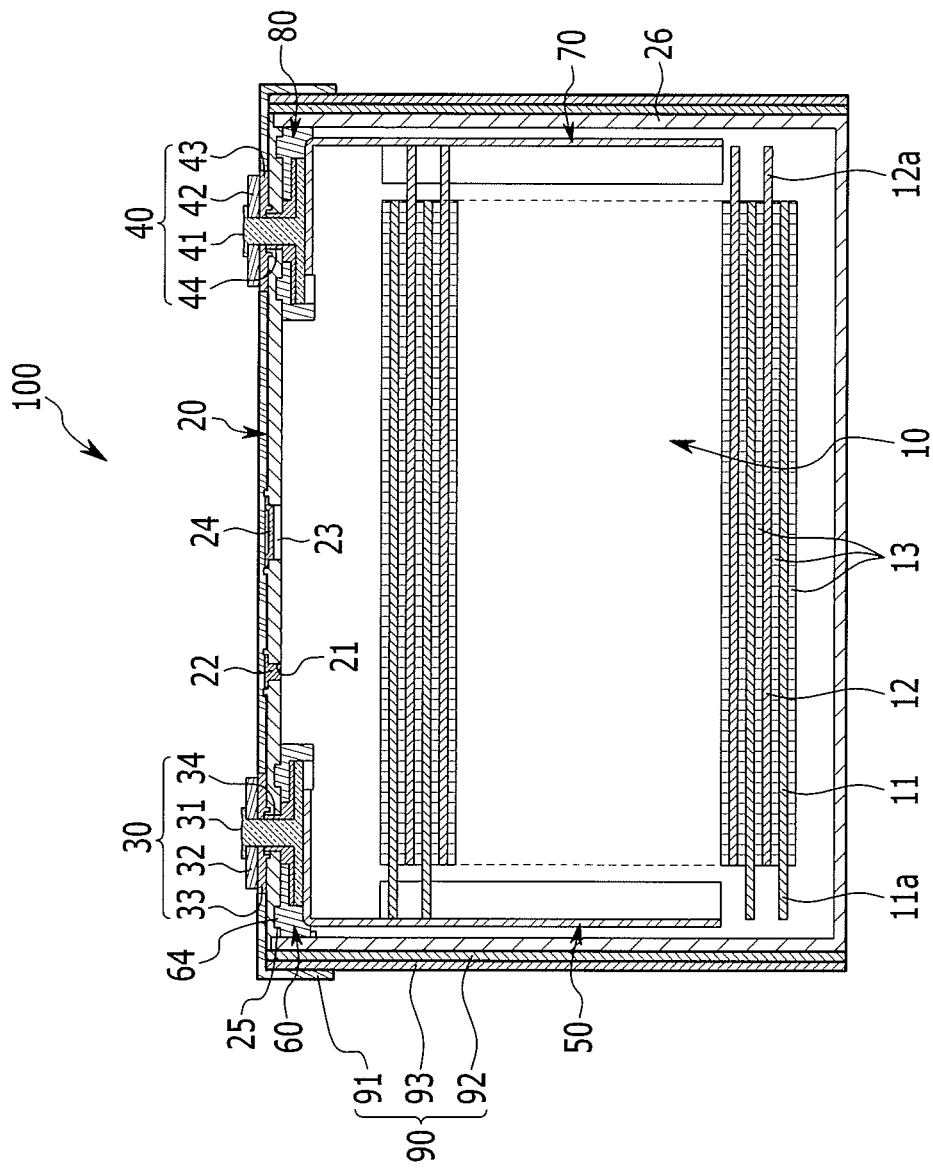
FIG. 2 is a cross-sectional view of the rechargeable battery of FIG. 1, taken along the line II-II.
Figure 3:
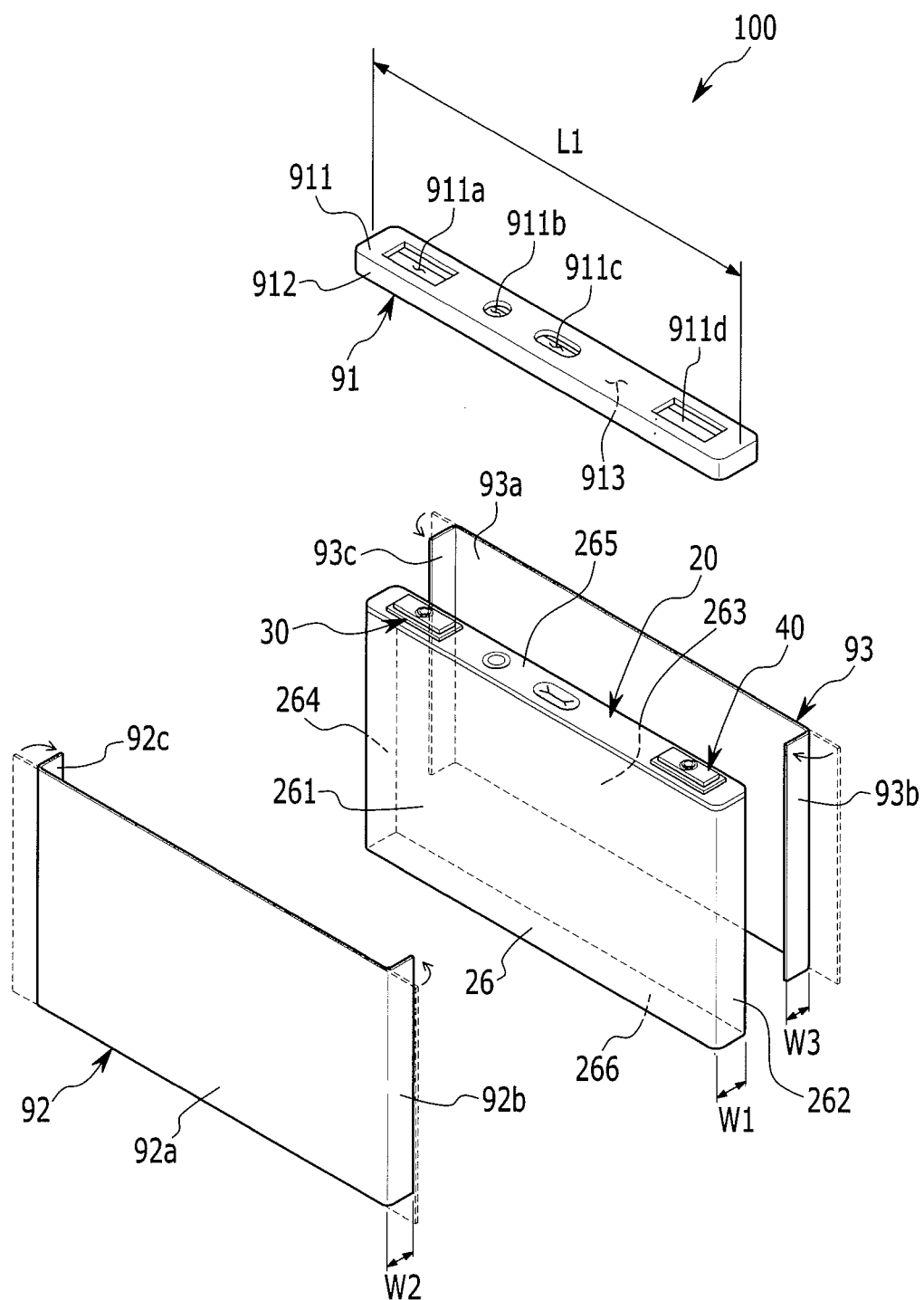
FIG. 3 is an exploded perspective view of the rechargeable battery of FIG. 1.

FIG. 1 is a perspective view of a rechargeable battery according to an exemplary embodiment of the present invention; and FIG. 2 is a cross-sectional view with respect to a line II-II in FIG. 1. FIG. 3 is an exploded perspective view of a rechargeable battery shown in FIG. 1.

Referring to FIG. 1 and FIG. 2, a rechargeable battery 100, according to an exemplary embodiment of the present invention, includes an electrode assembly 10 wound with a separator 13 between a first electrode 11 and a second electrode 12, a case 26 in which the electrode assembly 10 is contained, a first terminal 30 and a second terminal 40 electrically connected to the electrode assembly 10 through a first electrode current collecting member 50 and a second electrode current collecting member 70, respectively, a cap plate 20 combined to an opening formed in the case 26, and first and second internal insulating members 60 and 80 installed in the case 26.

The rechargeable battery 100 according to one embodiment is illustrated as a lithium ion rechargeable battery formed in the shape of a prism. However, the present invention is not limited thereto, and the present invention may be applied to a lithium polymer battery, a cylindrical battery, or the like.

In one embodiment, the first electrode 11 may be configured to be a negative electrode and the second electrode 12 may be configured to be a positive electrode. Alternatively, the first electrode 11 may be configured to be a positive electrode and the second electrode 12 may be configured to be a negative electrode.

The electrode assembly 10, in one embodiment, may be formed in a jelly roll shape by spirally winding the first electrode 11, the second electrode 12, and the separator 13. The first electrode 11 and the second electrode 12 may each include a current collector made of a thin-film metal foil, and an active material coated on a surface of the current collector.

Further, the first electrode 11 and the second electrode 12 may include a coated region generated by coating an active material on the current collector, and a first electrode uncoated region 11a of the first electrode 11 and a second electrode uncoated region 12a of the second electrode 12 without an active material coated on the current collector.

In one embodiment, the coated region forms most of the first electrode 11 and the second electrode 12 in the electrode assembly 10, and the first electrode and the second electrode uncoated regions 11a and 12a may be disposed in the jelly roll state on both sides of the coated region.

However, the present invention is not limited thereto, and, in another embodiment, the electrode assembly 10 may have a structure in which the first electrode 11 and the second electrode 12 formed as a plurality of sheets are stacked with the separator 13 therebetween.

In one embodiment, the first terminal 30 is electrically connected to the first electrode uncoated region 11a of the electrode assembly 10 through the first electrode current collecting member 50, and the second terminal 40 is electrically connected to the second electrode uncoated region 12a through the second electrode current collecting member 70.

The first and second terminals 30 and 40 may be provided at opposite ends of the cap plate 20 such that they are installed to be passed through the cap plate 20 and are exposed outside the rechargeable battery 100.

The case 26, in one embodiment, may be formed in a generally hexahedral shape, and an opening portion is formed at one side thereof to receive the electrode assembly 10 inside the case 26.

Further, the cap plate 20 is provided at the opening portion of the case 26. The cap plate 20 may be made as a thin plate and is combined with the opening of the case 26 to close and seal the opening. In one embodiment, an electrolyte injection opening 21 for injecting an electrolyte solution into the closed and sealed case 26 is formed in the cap plate 20, and the electrolyte injection opening 21 may be sealed by a sealing cap 22 after the electrolyte solution is injected. In one embodiment, a vent hole 23 in which a vent plate 24 is installed may be formed in the cap plate 20, such that when an internal pressure of the closed and sealed case 26 is greater than a certain pressure (e.g., a predetermined pressure), the vent plate 24 is opened.

In one embodiment, the first and second terminals 30 and 40 include first and second rivets 31 and 41, first and second terminal plates 32 and 42, a first terminal insulating member 33 installed between the first terminal plate 32 and the cap plate 20, a conductive connecting member 43 installed between the second terminal plate 42 and the cap plate 20, and first and second gaskets 34 and 44.

According to one exemplary embodiment, the cap plate 20 may be electrically connected to the second terminal 40 by the conductive connecting member 43 such that the cap plate 20 may have a negative or positive polarity.

In one embodiment, the first terminal 30 may include a circular cylinder-type of terminal (not shown) that is not a plate-type terminal.

In one embodiment, an insulating member rather than the conductive connecting member 43 may be installed between the cap plate 20 and the second terminal plate 42, such that the cap plate 20 may not be electrically connected to the second terminal 40.

The rechargeable battery 100 further includes an external insulating member 90 which, in one embodiment, includes an insulating cover 91, a first insulating tape 92, and a second insulating tape 93.

In one embodiment, the insulating cover 91 is combined to the first and second insulating tapes 92 and 93 to be combined to the outer surface of the case 26.

A combination of the external insulating member 90 and the outer surface of the case 26 according to an exemplary embodiment of the present invention is described below in further detail with reference to FIG. 3.

The case 26, in one embodiment, has a generally hexahedral shape including first to fourth sides 261, 262, 263, and 264, a case top 265 on which the cap plate 20 is installed, and a case bottom 266 provided on the opposite side of the case top 265.

The first and third sides 261 and 263 of the case 26, in one embodiment, are wider than the second and fourth sides 262 and 264, are facing each other, and are connected by the second and fourth sides 262 and 264.

However, in other embodiments of the present invention, the case 26 is not restricted to be a hexahedral shape, and it may have a cylindrical, hexahedral, or pouch shape, for example.

The first and second insulating tapes 92 and 93 of the external insulating member 90 may be made of an insulating material (e.g., polyethylene terephthalate).

An adhesive may be applied to one side of the first and second insulating tapes 92 and 93. In one embodiment, the first and second insulating tapes 92 and 93 are 70 μm to 100 μm thick.

In one embodiment, the first insulating tape 92 includes a first body 92a, a first bent portion 92b, and a second bent portion 92c.

Here, the first and second bent portions 92b and 92c of the first insulating tape 92 are extended from both ends of the first body 92a.

Therefore, the first body 92a of the first insulating tape 92 may be combined to the first side 261 of the case 26, and the first and second bent portions 92b and 92c may be combined to the second and fourth sides 262 and 264 of the case 26, respectively.

In one embodiment, as shown in FIG. 3, the first and second bent portions 92b and 92c are bent in a direction indicated by arrows at both ends of the first body 92a, and are combined to the second and fourth sides 262 and 264 of the case 26, respectively.

In one embodiment, a second body 93a of the second insulating tape 93 is combined to the third side 263 of the case 26 facing the first side 261 of the case 26 to which the first body 92a of the first insulating tape 92 is combined.

The second insulating tape 93, in one embodiment, includes first and second bent portions 93b and 93c extended at both ends of the second body 93a.

Therefore, when the second body 93a is combined to the third side 263 of the case 26, the first and second bent portions 93b and 93c are bent in the direction of the arrows shown in FIG. 3, and the first bent portion 93b is combined with the second side 262 of the case 26 and the first bent portion 92b of the first insulating tape 92 combined to the second side 262 of the case 26, and the second bent portion 93c is combined with the fourth side 264 of the case 26 and the second bent portion 92c of the first insulating tape 92 combined to the fourth side 264 of the case 26.

If a sum of a width W2 of the first bent portion 92b of the first insulating tape 92 and a width W3 of the first bent portion 93b of the second insulating tape 93 is less than or equal to a width W1 of the second side 262 of the case 26, the second side 262 of the case 26 may be exposed between the first bent portion 92b of the first insulating tape 92 and the first bent portion 93b of the second insulating tape 93.

Therefore, in an exemplary embodiment, a sum of the width W2 of the first bent portion 92b of the first insulating tape 92 and the width W3 of the first bent portion 93b of the second insulating tape 93 is greater than the width W1 of the second side 262 of the case 26.

In one embodiment, the width W2 of the first bent portion 92b of the first insulating tape 92 may be formed to be substantially equal to a width of the second bent portion 92c of the first insulating tape 92, and the width W3 of the first bent portion 93b of the second insulating tape 93 may be formed to be substantially equal to a width of the second bent portion 93c of the second insulating tape 93.

In one embodiment, a step is formed at respective parts where the first and second bent portions 93b and 93c of the second insulating tape 93 meet the first and second bent portions 92b and 92c of the first insulating tape 92, and the step may become a path on which moisture generated on the outer surface of the case 26 flows.

Therefore, the moisture can be discharged following the step from the outer surface of the case 26.

The insulating cover 91, in one embodiment, may be formed through vacuum molding or injection molding, and may be made of an acrylonitrile butadiene styrene (ABS) copolymer, polypropylene, polyethylene, and polycarbonate.

In one embodiment, the insulating cover 91 includes a body 911, a side 912 protruded from the body 911, and a fixing groove 913 formed between the body 911 and the side 912.

In one embodiment, the body 911 of the insulating cover 91 includes a first terminal coupling hole 911a, an electrolyte injection opening coupling hole 911b, a vent plate coupling hole 911c, and a second terminal coupling hole 911d.

When the insulating cover 91 is combined to the case top 265 where the cap plate 20 is provided, the first and second terminals 30 and 40 may be inserted into and combined into the first and second terminal coupling holes 911a and 911d of the body 911 of the insulating cover 91, respectively.

Also, the sealing cap 22 for closing and sealing the electrolyte injection opening 21 may be inserted into and combined to the electrolyte injection opening coupling hole 911b, and the vent plate 24 may be inserted into and combined to the vent plate coupling hole 911c.

In one embodiment, when the insulating cover 91 is combined to the case top 265, the side 912 of the insulating cover 91 is provided on the first and second insulating tapes 92 and 93.

The insulating cover 91, in one embodiment, may be forcibly inserted into and combined to the case 20 or it may be combined to the case 26 by applying an adhesive on a surface of the insulating cover 91 facing the case 26.

Therefore, the insulating cover 91 may be closely combined to the case top 265.

In one embodiment, the side 912 of the insulating cover 91 covers a part where an edge of the first bent portion 92b of the first insulating tape 92, an edge of the first bent portion 93b of the second insulating tape 93 meet, and a part where an edge of the second bent portion 92c of the first insulating tape 92, and an edge of the second bent portion 93c of the second insulating tape 93 meet.

Therefore, exposure of the outer surface of the case 26 at the edge of the first bent portion 92b of the first insulating tape 92 and the edge of the first bent portion 93b of the second insulating tape 93 is prevented or substantially prevented.

The insulating cover 91 of the external insulating member 90 prevents or substantially prevents exposure of the outer surface of the case 26 in a space between the cap plate 20 and the first and second insulating tapes 92 and 93.

As a result, the first to fourth sides 261, 262, 263, and 264 of the case 26 and the case top 265 are closed and sealed without exposure to the outside, and the external insulating member 90 is easily combined to the outer surface of the case 26.

In one embodiment, the first and second insulating tapes 92 and 93 have a thickness (e.g., a uniform or predetermined thickness, such as 70 µm to 100 µm) such that the outer surface of the case 26 may be uniformly insulated.

Figure 4:
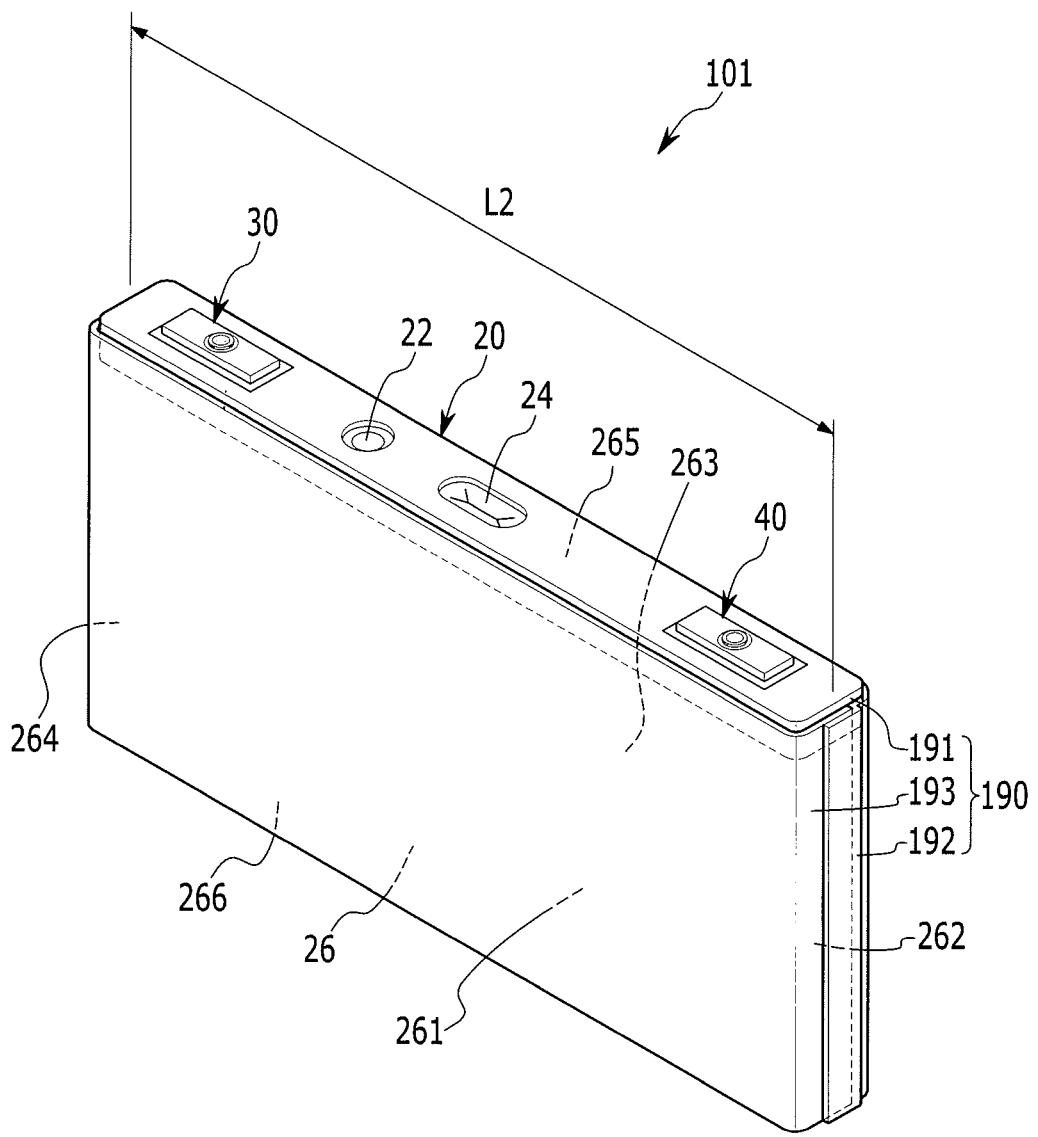
FIG. 4 is a perspective view of a rechargeable battery according to another exemplary embodiment of the present invention.

FIG. 4 is a perspective view of a rechargeable battery according to another exemplary embodiment of the present invention.

A rechargeable battery 101 according to another exemplary embodiment of the present invention is similar to the rechargeable battery 100 described above except for a combination order of an insulating cover 191 of an external insulating member 190 and first and second insulating tapes 192 and 193 of the external insulating member 190. Description of components or features of the rechargeable battery 101 which are the same as those of the rechargeable battery 100 described above will not be repeated.

Referring to FIG. 4, in one embodiment, the first and second insulating tapes 192 and 193 of the external insulating member 190 are installed on the insulating cover 191.

That is, the first and second insulating tapes 192 and 193 are combined over the insulating cover 191.

Therefore, a length L2 of the insulating cover 191 may be formed to be less than a length L1 of the insulating cover 91 of the rechargeable battery 100 described above by a sum of thicknesses of the first and second insulating tapes 192 and 193.

In one embodiment, a step formed at the part where the edges of the first and second insulating tapes 192 and 193 meet is provided on the insulating cover 191 such that there is no space between the insulating cover 191 and the first and second insulating tapes 192 and 193.

Therefore, when the insulating cover 191 is provided under the step formed at the part where the first and second insulating tapes 192 and 193 meet, no space is formed between the step and the insulating cover 191 such that the outer surface of the case 26 is effectively insulated from the outside.

Also, the first and second insulating tapes 192 and 193 are provided on the insulating cover 191 such that the insulating cover 191 is stably fixed to the case 26 by the first and second insulating tapes 192 and 193.

Figure 5:
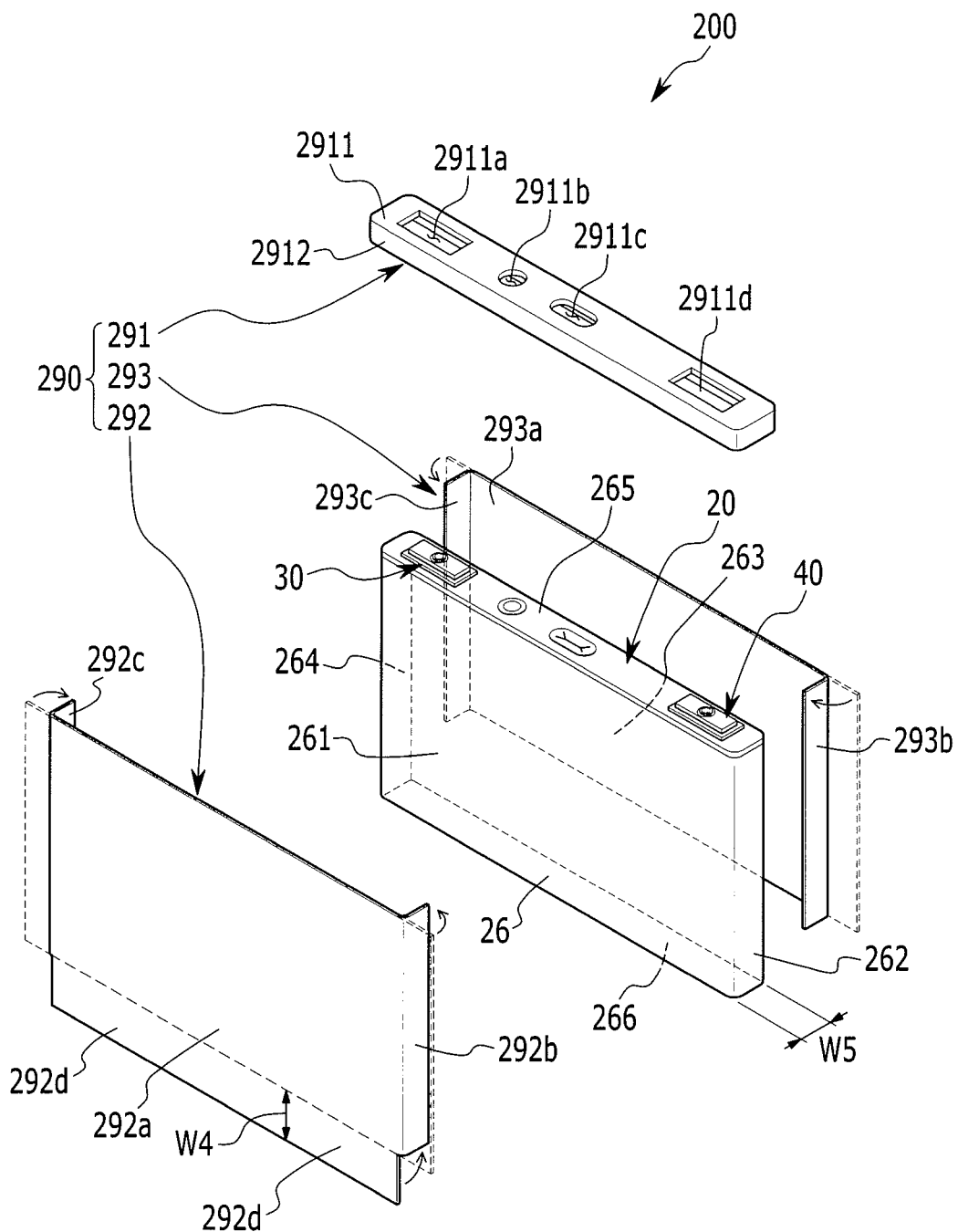
FIG. 5 is an exploded perspective view of a rechargeable battery according to another exemplary embodiment of the present invention.

FIG. 5 is an exploded perspective view of a rechargeable battery according to another exemplary embodiment of the present invention.

Referring to FIG. 5, a rechargeable battery 200 according to another exemplary embodiment of the present invention has the same configuration as the rechargeable battery 100 described above except for an external insulating member 290. Description of components or features of the rechargeable battery 200 which are the same as those of the rechargeable battery 100 described above will not be repeated.

The external insulating member 290 includes an insulating cover 291, a first insulating tape 292, and a second insulating tape 293.

The insulating cover 291 according to one exemplary embodiment has the same configuration as the insulating cover 91 of the rechargeable battery 100 described above, and, therefore, further description thereof will not be repeated.

The insulating cover 291 is combined to the first and second insulating tapes 292 and 293 and is then combined to the outer surface of the case 26.

Referring to FIG. 5, a combination of the external insulating member 290 and the outer surface of the case 26, according to an exemplary embodiment of the present invention, is described in further detail below.

In one embodiment, the first and second insulating tapes 292 and 293 of the external insulating member 290 may be made of an insulating material (e.g., polyethylene terephthalate).

In one embodiment, an adhesive may be applied to one side of the first and second insulating tapes 292 and 293. In one embodiment, the first and second insulating tapes 292 and 293 are 70 µm to 100 µm thick.

In one embodiment, the first insulating tape 292 includes a first body 292a, a first bent portion 292b, a second bent portion 292c, and a third bent portion 292d.

The first body 292a, the first bent portion 292b, and the second bent portion 292c of the first insulating tape 292, according to one exemplary embodiment, have the same configuration as the first body 92a, the first bent portion 92b, and the second bent portion 92c, respectively, of the first insulating tape 92 of the rechargeable battery 100 described above, and, therefore, further description thereof will not be repeated.

The third bent portion 292d of the first insulating tape 292 is extended from one end of the first body 292a.

In one embodiment, the third bent portion 292d of the first insulating tape 292 is extended and formed in a direction that is perpendicular with respect to a direction in which the first and second bent portions 292b and 292c are extended.

Therefore, when the first insulating tape 292 is combined to the outer surface of the rectangular parallelepiped-shaped case 26, the first body 292a of the first insulating tape 292 is combined to the first side 261 of the case 26, the first and second bent portions 292b and 292c are combined to the second and fourth sides 262 and 264 of the case 26, respectively, and the third bent portion 292d of the first insulating tape 292 is combined to the case bottom 266 for connecting narrow sides of the case 26.

In one embodiment, a width W4 of the third bent portion 292d of the first insulating tape 292 is equal to or greater than a width W5 of the case bottom 266 to which the third bent portion 292d is combined.

The second insulating tape 293, in one embodiment, includes a second body 293a, a first bent portion 293b, and a second bent portion 293c having the same configuration as the second insulating tape 93 of the rechargeable battery 100 described above, and, therefore, further description thereof will not be repeated.

The external insulating member 290 is combined to the first to fourth sides 261, 262, 263, and 264, the case top 265, and the case bottom 266 of the case 26.

Therefore, the external insulating member 290 blocks exposure of the entire outer surface of the case 26 to the outside and closes and seals the case 26.

Figure 6:
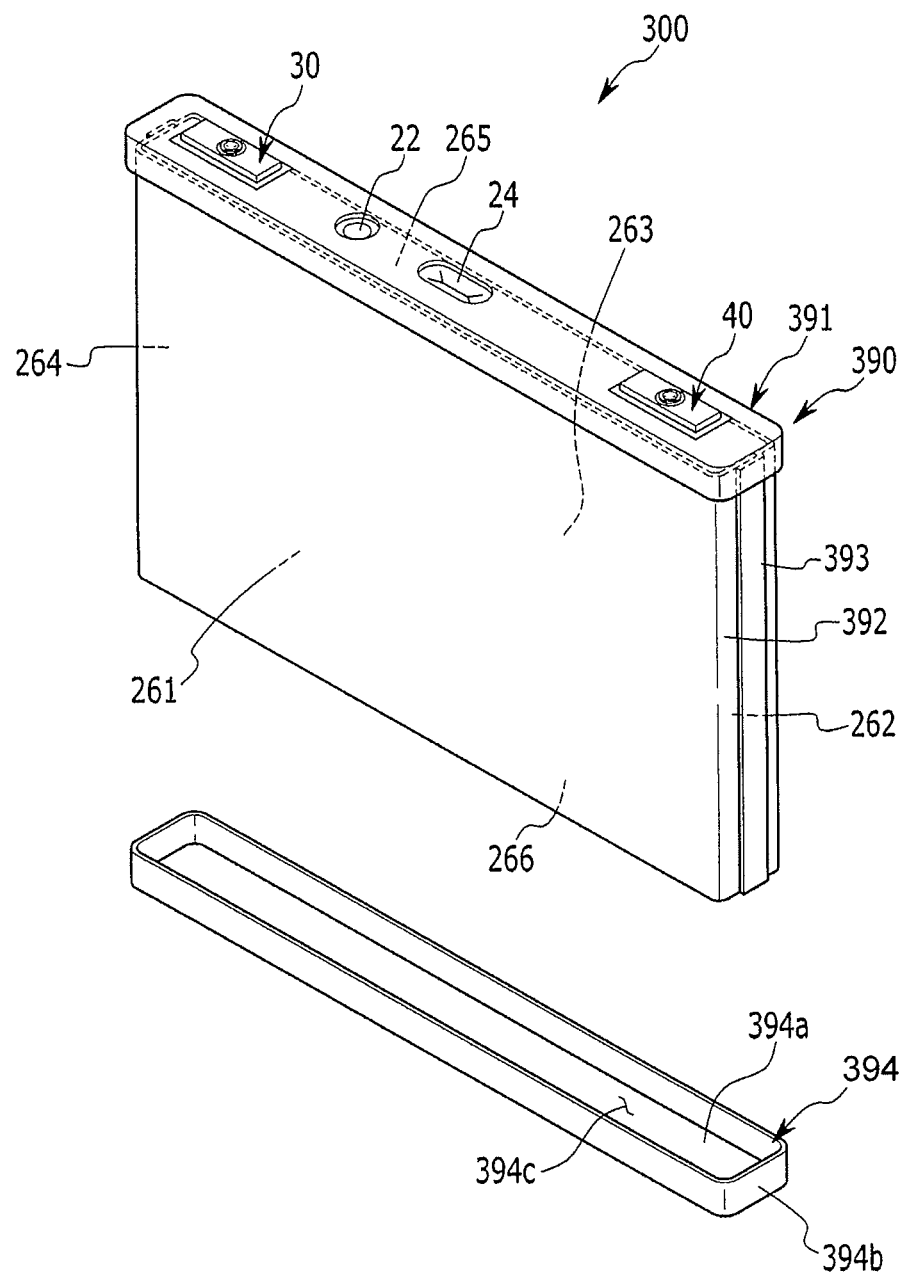
FIG. 6 is a partially exploded perspective view of a rechargeable battery according to another exemplary embodiment of the present invention.

FIG. 6 is a partially exploded perspective view of a rechargeable battery according to another exemplary embodiment of the present invention.

Referring to FIG. 6, a rechargeable battery 300 according to another exemplary embodiment of the present invention has the same configuration as the rechargeable battery 100 described above except for an external insulating member 390. Description of components or features of the rechargeable battery 300 which are the same as those of the rechargeable battery 100 described above will not be repeated.

The external insulating member 390 of the rechargeable battery 300 includes an insulating cover 391, a first insulating tape 392, a second insulating tape 393, and a bottom insulating cover 394.

In one embodiment, the insulating cover 391, the first insulating tape 392, and the second insulating tape 393 of the external insulating member 390 have the same configuration as the insulating cover 91, the first insulating tape 92, and the second insulating tape 93 of the rechargeable battery 100 described above, and, therefore, further description thereof will not be repeated.

In one embodiment, the bottom insulating cover 394 of the external insulating member 390 includes a body 394a, a side 394b extended from the body 394a, and a receiving groove 394c provided between the body 394a and the side 394b.

The bottom insulating cover 394, in one embodiment, may be formed through vacuum molding or injection, and it may be made of one of an acrylonitrile butadiene styrene (ABS) copolymer, polypropylene, polyethylene, or polycarbonate.

While the first and second insulating tapes 392 and 393 are combined to the case 26, the case bottom 266 can be inserted into and fixed to the receiving groove 394c of the bottom insulating cover 394.

In one embodiment, the bottom insulating cover 394 can be combined to the case 26 through forcible insertion.

However, the combination of the bottom insulating cover 394 and the case 26 is not restricted to forcible insertion, and, in one embodiment, the bottom insulating cover 394 and the case 26 may be combined by a double-sided adhesive tape (not shown).

In one embodiment, when the bottom insulating cover 394 is combined to the case bottom 266, the side 394b of the bottom insulating cover 394 is provided on the first and second insulating tapes 392 and 393.

Therefore, the bottom insulating cover 394 may be closely combined to the case bottom 266.

In one embodiment, the side 394b of the bottom insulating cover 394 covers a part where an edge of the first insulating tape 392 meets an edge of the second insulating tape 393.

Therefore, contact of the outer surface of the case 26 and the outside at the edge of the first insulating tape 392 and the edge of the second insulating tape 393 can be effectively intercepted.

The bottom insulating cover 394 of the external insulating member 390 prevents or substantially prevents exposure of the outer surface of the case 26 in a space between the case bottom 266 and the first and second insulating tapes 392 and 393.

Figure 7:
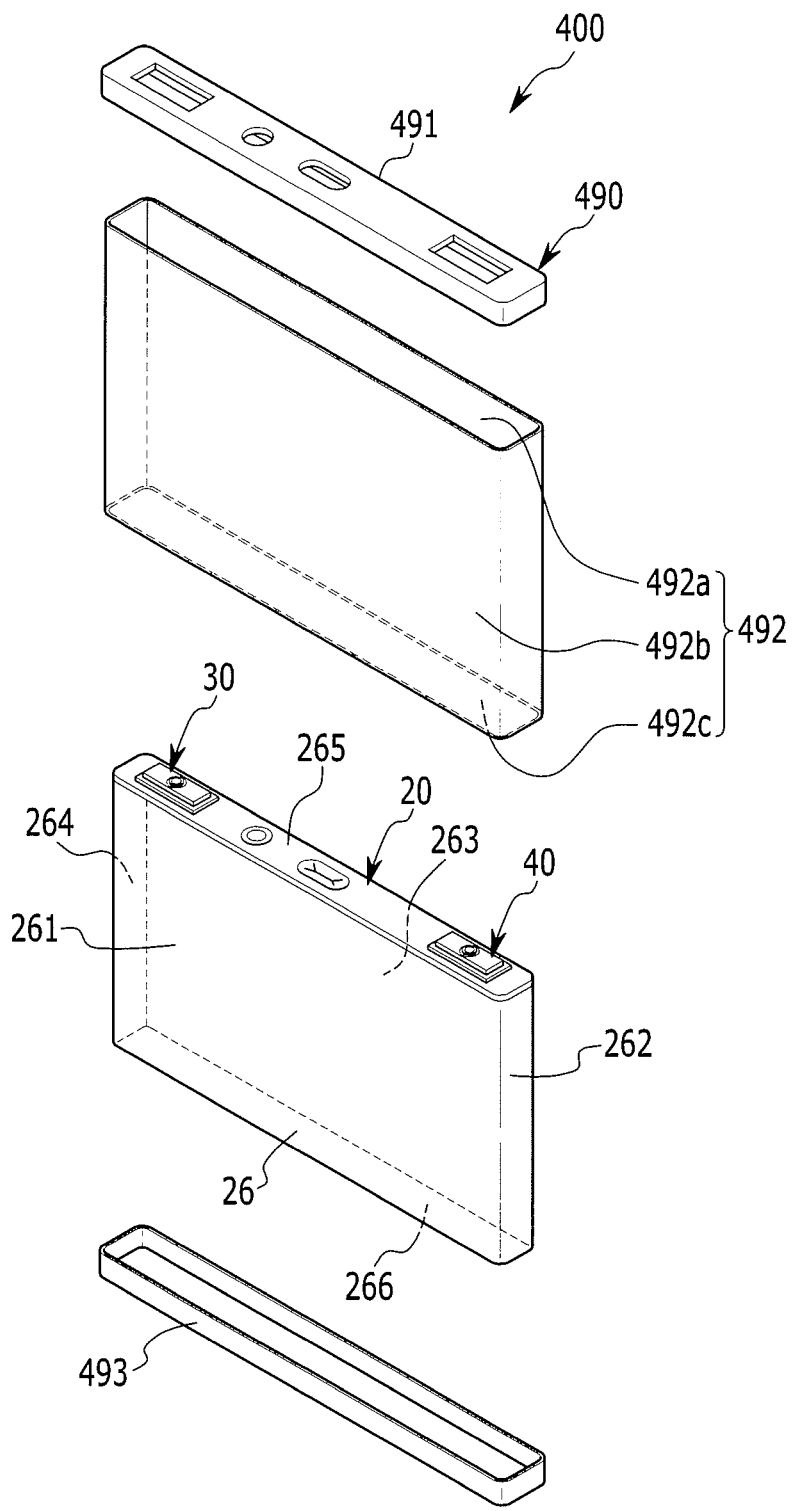
FIG. 7 is an exploded perspective view of a rechargeable battery according to another exemplary embodiment of the present invention.

FIG. 7 is an exploded perspective view of a rechargeable battery according to another exemplary embodiment of the present invention.

Referring to FIG. 7, a rechargeable battery 400 according to another exemplary embodiment of the present invention has the same configuration as the rechargeable battery 300 described above except for an external insulating member 490. Description of components or features of the rechargeable battery 400 which are the same as those of the rechargeable battery 300 described above will not be repeated.

The external insulating member 490 of the rechargeable battery 400 includes an insulating cover 491, an insulating tape 492, and a bottom insulating cover 493.

The insulating cover 491 and the bottom insulating cover 493 of the external insulating member 490 have the same configuration as the insulating cover 391 and the bottom insulating cover 394 of the rechargeable battery 300 described above, and, therefore, further description thereof will not be repeated.

In one embodiment, the insulating tape 492 of the external insulating member 490 includes a first opening 492a, a body 492b, and a second opening 492c.

In one embodiment, the body 492b of the insulating tape 492 includes a hollow unit into which the case 26 is inserted. In one embodiment, the body 492b of the insulating tape 492 may be formed through injection molding, and an adhesive may be applied to the hollow area of the body 492b.

Therefore, when the case 26 is inserted into the hollow area of the body 492b, the body 492b of the insulating tape 492 is combined to the first to fourth sides 261, 262, 263, and 264 at the outer surface of the case 26.

In one embodiment, the insulating cover 491 is combined to a part where the first opening 492a of the insulating tape 492 is provided, and the bottom insulating cover 493 is combined to a part where the second opening 492c of the insulating tape 492 is provided.

Therefore, all sides (e.g., six sides of a cuboid) of the case 26 are closed and sealed by the insulating member 490.

Further, the case 26 is inserted into the insulating tape 492 and is combined to the insulating tape 492 such that the outer surface of the case 26 is easily insulated.

Figure 8:
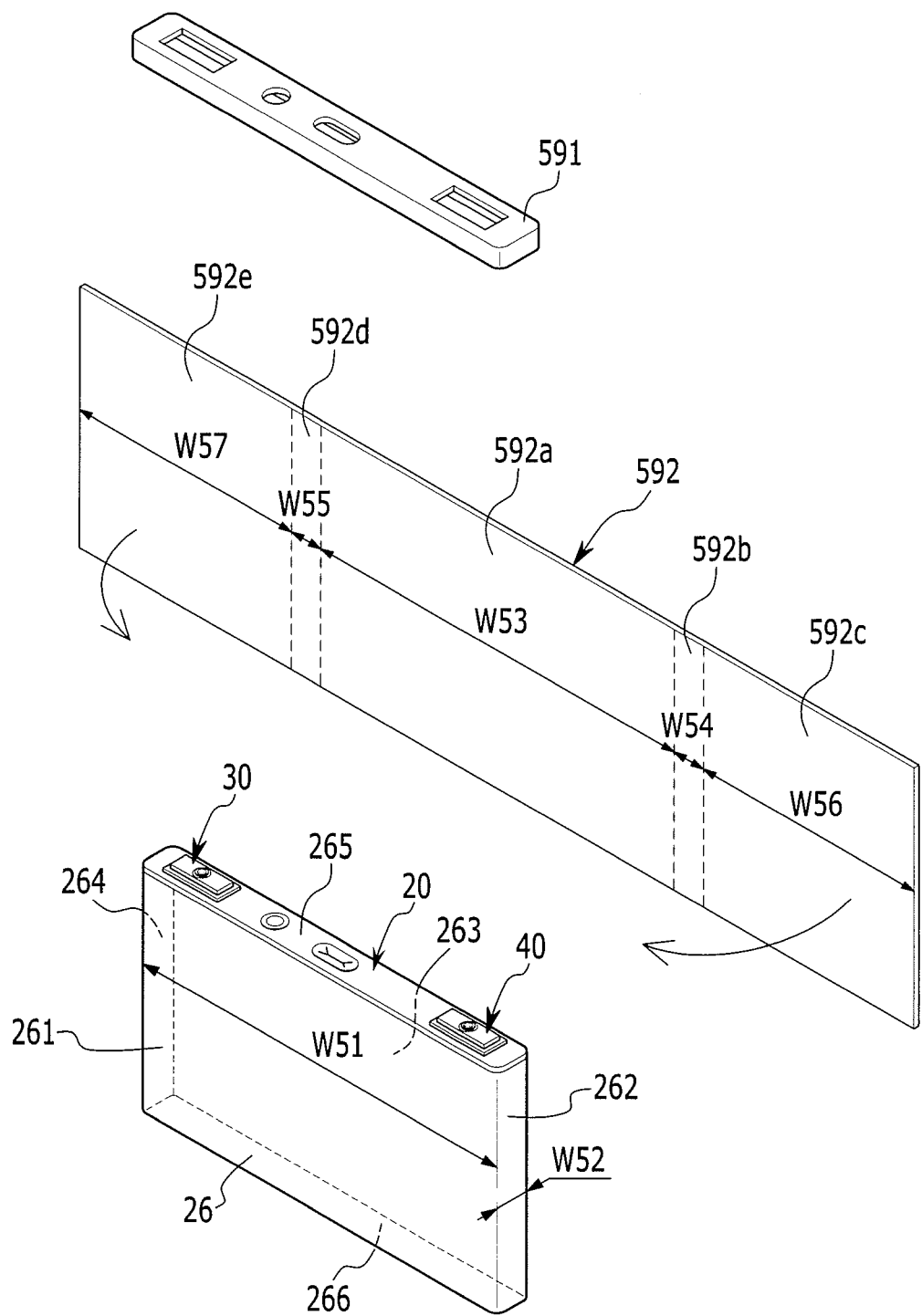
FIG. 8 is an exploded perspective view of a rechargeable battery according to another exemplary embodiment of the present invention.
Figure 9:
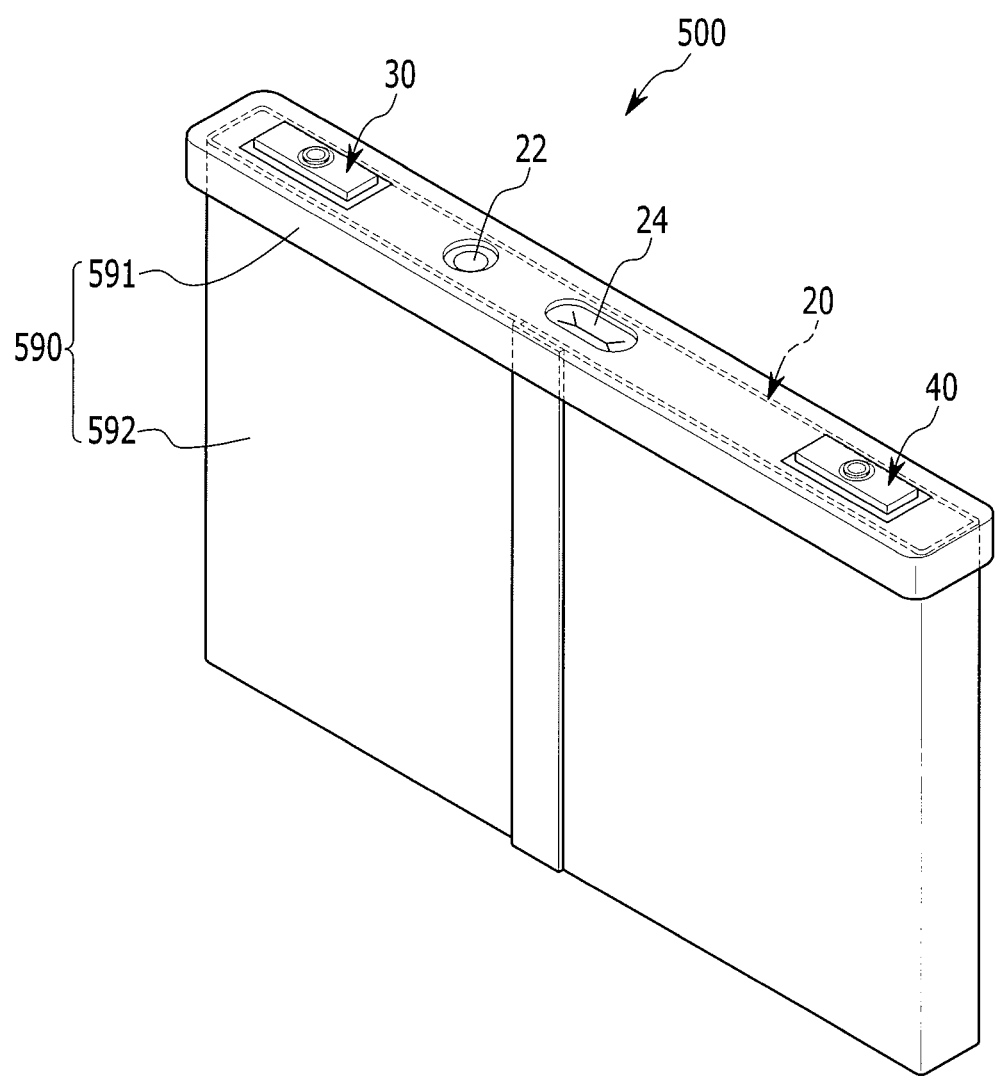
FIG. 9 is a perspective view of the rechargeable battery of FIG. 8.

FIG. 8 is an exploded perspective view of a rechargeable battery according to another exemplary embodiment of the present invention; and FIG. 9 is a perspective view of the rechargeable battery of FIG. 8.

Referring to FIG. 8 and FIG. 9, a rechargeable battery 500 according to another exemplary embodiment of the present invention has the same configuration as the rechargeable battery 100 described above except for an external insulating member 590. Description of components or features of the rechargeable battery 500 which are the same as those of the rechargeable battery 100 described above will not be repeated.

The external insulating member 590 of the rechargeable battery 500 includes an insulating cover 591 and an insulating tape 592.

In one embodiment, the insulating cover 591 of the external insulating member 590 has the same configuration as the insulating cover 91 of the external insulating member 90 of the rechargeable battery 100 described above, and, therefore, further description thereof will not be repeated.

The insulating tape 592 of the external insulating member 590 according to an exemplary embodiment is made of an insulating material (e.g., polyethylene terephthalate).

In one embodiment, an adhesive may be applied to one side of the insulating tape 592. In one embodiment, the insulating tape 592 is 70 μm to 100 μm thick.

In one embodiment, the insulating tape 592 includes a first portion 592a, a second portion 592b, a third portion 592c, a fourth portion 592d, and a fifth portion 592e.

Referring to FIG. 8 and FIG. 9, the first portion 592a of the insulating tape 592 is combined to the third side 263 of the case 26. In one embodiment, a width W53 of the first portion 592a substantially corresponds to a width W51 of the first side 261 of the case.

Also, the second portion 592b and the fourth portion 592d are combined to the second and fourth sides 262 and 264 of the case 26, respectively, and, in one embodiment, a width W54 of the second portion 592b and a width W55 of the fourth portion 592d correspond to a width W52 of the second side 262 of the case 26.

Further, the third portion 592c and the fifth portion 592e are combined to the first side 261 of the case 26.

If a sum of a width W56 of the third portion 592c and a width W57 of the fifth portion 592e is less than or equal to the width W51 of the first side 261 of the case 26, a part of the outer surface of the first side 261 of the case 26 can be exposed to the outside.

Therefore, in an exemplary embodiment of the present invention, a sum of the width W56 of the third portion 592c and the width W57 of the fifth portion 592e is greater than the width W51 of the first side 261 of the case 26.

Hence, the third portion 592c and the fifth portion 592e of the insulating tape 592 are provided to be overlapped with each other when combined to the first side 261 of the case 26.

In one embodiment, a step is formed at the part where the third portion 592c of the insulating tape 592 meets the fifth portion 592e.

Resultantly, the first to fourth sides 261, 262, 263, and 264 of the case 26 are closed and sealed by the external insulating member 590 without exposure to the outside.

Further, the first to fourth sides 261, 262, 263, and 264 of the case 26 are wrapped by the insulating tape 592, and the insulating cover 591 combined on the insulating tape 592 is combined to the case top 265 such that the case 26 is easily combined to the external insulating member 590.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery comprising:
   an electrode assembly;
   a case containing the electrode assembly;
   a cap plate covering an opening of the case; and
   an external insulating member on an outer surface of the case, the external insulating member comprising:
   an insulating cover on the cap plate; and
   an insulating tape coupled to the insulating cover on the outer surface of the case,
   wherein an area of the insulating tape is greater than an external surface area of the case, and
   wherein the insulating tape is coupled to a side of the case extending between a first end of the case and a second end of the case opposite the first end, the insulating tape contacting the outer surface of the case on the side of the case from the first end to the second end,
   wherein the insulating cover comprises:
   a body portion on the first end of the case; and
   a side portion extending from the body portion and covering a portion of a side of the case extending between the first end of the case and the second end of the case opposite the first end,
   wherein the body portion and the side portion together define a recess of the insulating cover receiving the first end of the case.

2. The rechargeable battery of claim 1, wherein at least a portion of the insulating tape is interposed between the case and the insulating cover.

3. The rechargeable battery of claim 1, wherein at least a portion of the insulating cover is interposed between the case and the insulating tape.

4. The rechargeable battery of claim 1,
   wherein the insulating cover is coupled to at least one of the cap plate or the case at a first end of the case.

5. The rechargeable battery of claim 1, wherein the insulating tape comprises:
   a first insulating tape on a first side of the case extending between the first end of the case and the second end of the case opposite the first end; and
   a second insulating tape on a second side of the case extending between the first end of the case and the second end of the case, the second side being opposite to the first side.

6. The rechargeable battery of claim 5,
   wherein the first insulating tape comprises:
   a body portion on the first side of the case;
   a first side portion on a third side of the case extending between the first and second sides of the case; and
   a second side portion on a fourth side of the case opposite the third side and extending between the first and second sides of the case, and
   wherein the second insulating tape comprises:
   a body portion on the second side of the case;
   a first side portion on the third side of the case; and
   a second side portion on the fourth side of the case.

7. The rechargeable battery of claim 6, wherein a width of the third side of the case is less than a sum of a width of the first side portion of the first insulating tape and a width of the first side portion of the second insulating tape.

8. The rechargeable battery of claim 6,
wherein the third and fourth sides of the case are substantially perpendicular to the first and second sides, and
wherein the first and second side portions of the first insulating tape are substantially perpendicular relative to the body portion of the first insulating tape, and the first and second side portions of the second insulating tape are substantially perpendicular relative to the body portion of the second insulating tape.

9. The rechargeable battery of claim 5, wherein an end of the second insulating tape overlaps an end of the first insulating tape.

10. The rechargeable battery of claim 1, wherein the side portion of the insulating cover covers a portion of the insulating tape.

11. The rechargeable battery of claim 1, wherein the insulating tape at least partially covers the side portion of the insulating cover.

12. The rechargeable battery of claim 1, wherein the insulating cover comprises an adhesive, and the insulating cover is coupled to at least one of the cap plate or the case via the adhesive.

13. The rechargeable battery of claim 1, wherein the insulating tape covers the second end of the case opposite the first end.

14. The rechargeable battery of claim 13, wherein a portion of the insulating tape covering the second end of the case is at an angle relative to a portion of the insulating tape on a side of the case extending between the first and second ends.

15. The rechargeable battery of claim 14, wherein a width of the portion of the insulating tape is greater than a width of the case at the second end.

16. The rechargeable battery of claim 1, wherein the insulating cover is a first insulating cover, and the external insulating member further comprises a second insulating cover on the second end of the case opposite the first end.

17. The rechargeable battery of claim 16, wherein the second insulating cover comprises:
a body portion covering the second end of the case; and
a side portion extending from the body portion of the second insulating cover and covering a portion of the insulating tape,
wherein the body portion of the second insulating cover and the side portion of the second insulating cover together define a recess of the second insulating cover receiving the second end of the case.

18. The rechargeable battery of claim 1, wherein the insulating tape has a thickness of 70 μm to 100 μm.

* * * * *